US009401009B2

(12) United States Patent
Xu et al.

(10) Patent No.: US 9,401,009 B2
(45) Date of Patent: Jul. 26, 2016

(54) METHOD AND APPARATUS FOR ENHANCING QUALITY OF 3D IMAGE

(71) Applicant: SAMSUNG ELECTRONICS CO., LTD., Suwon-si (KR)

(72) Inventors: Kuanhong Xu, Beijing (CN); Qiang Wang, Beijing (CN); Woo-young Jang, Seongnam-si (KR); Ji-yeun Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 132 days.

(21) Appl. No.: 14/199,049

(22) Filed: Mar. 6, 2014

(65) Prior Publication Data

US 2014/0254920 A1 Sep. 11, 2014

(30) Foreign Application Priority Data

Mar. 6, 2013 (CN) .......................... 2013 1 0071253
Feb. 4, 2014 (KR) ........................ 10-2014-0012787

(51) Int. Cl.
*G06K 9/00* (2006.01)
*G06K 9/40* (2006.01)
*G01N 23/00* (2006.01)
*H01J 37/20* (2006.01)
*G06T 5/00* (2006.01)
*G06T 7/00* (2006.01)

(52) U.S. Cl.
CPC .............. *G06T 5/002* (2013.01); *G06T 7/0081* (2013.01); *G06T 2207/20012* (2013.01)

(58) Field of Classification Search
None
See application file for complete search history.

(56) References Cited

U.S. PATENT DOCUMENTS

| 2004/0021775 | A1* | 2/2004 | Kondo ..................... G06T 7/20 348/207.99 |
| 2005/0061974 | A1* | 3/2005 | Kim ........................ G01N 23/04 250/310 |
| 2008/0056445 | A1* | 3/2008 | Spahn .................... A61B 6/544 378/62 |
| 2008/0123912 | A1* | 5/2008 | Lal ........................ G06T 7/0083 382/128 |
| 2012/0063660 | A1 | 3/2012 | Imamura et al. |
| 2014/0105484 | A1* | 4/2014 | Lee ........................ G06T 3/4053 382/154 |

FOREIGN PATENT DOCUMENTS

JP 2011-97992 A 5/2011
JP 2011-226985 A 11/2011

OTHER PUBLICATIONS

Fang, et al., "Sparsity based denoising of spectral domain optical coherence tomography images", Biomedical Optics Express, vol. 3, Apr. 12, 2012, 16 pages total.

* cited by examiner

*Primary Examiner* — Randolph I Chu
(74) *Attorney, Agent, or Firm* — Sughrue Mion, PLLC

(57) ABSTRACT

A method of enhancing a quality of a 3 dimensional (3D) image includes classifying an input 3D image into a plurality of sub-areas based on noise characteristics of the plurality of sub-areas of the input 3D image, denoising each of the plurality of sub-areas of the input 3D image by using different denoising methods according to noise characteristics of each of the classified plurality of sub-areas and obtaining a second 3D image after the denoising, and enhancing a contrast ratio of the second 3D image after the denoising.

10 Claims, 5 Drawing Sheets

METHOD AND APPARATUS FOR ENHANCING QUALITY OF 3D IMAGE

CROSS-REFERENCE TO RELATED APPLICATIONS

This application claims priority from Chinese Patent Application No. 201310071253.3, filed on Mar. 6, 2013, in the State Intellectual Property Office of the People's Republic of China, and Korean Patent Application No. 10-2014-0012787, filed on Feb. 4, 2014, in the Korean Intellectual Property Office the disclosures of which are incorporated herein by reference in their entirety.

BACKGROUND

1. Field

Apparatuses and methods consistent with the exemplary embodiments relate to processing a 3 dimensional (3D) image that is captured by optical coherence tomography (OCT), and more particularly, to a method and apparatus for enhancing the quality of a 3D image by denoising the 3D image and enhancing a contrast ratio of the 3D image.

2. Description of the Related Art

Optical coherence tomography (OCT) technology is a high-resolution biological tissue imaging technology that has been developed in the last several decades. Although OCT technology has been successfully used in ophthalmology clinical medicine, it is still incomplete in fields where very dense tissues are photographed, for example, in a tumor test and a skin disease test. Since very dense tissues highly disperse light and thus lower invasiveness, a signal-to-noise ratio of an OCT system and a dynamic range of a generated image are greatly degraded so that the interpretation and diagnosis of organs and lesions in an image are difficult. In order to enhance a resolution of an image of very dense tissues, image denoising must be performed quickly and efficiently and a contrast ratio in a detailed part of an image must be enhanced.

Noise in an OCT image mainly includes additive noise and multiplicative noise which are also called non-coherent noise and coherent noise. A denoising method is mainly divided into denoising based on hardware and denoising based on digital filtering. The hardware-based denoising is a mixed technology primarily of a space, a frequency, an angle, and a polarization state. In an ideal environment, additive noise and multiplicative noise of a system may be physically reduced by such a mixed technology. However, since additional system hardware is needed, manufacturing costs of the system may be increased. Also, since the mixed technology needs separate scanning and image averaging processes, a system imaging speed and an image contrast ratio are remarkably lowered. In comparison with the above, a software-based real-time post-treatment method may denoise an image and enhance a contrast ratio without affecting an imaging speed. Thus, the software-based real-time post-treatment method is a superior method that may replace the hardware-based processing method.

Most existing denoising and image enhancing methods are applied to 2D images and also suggest different denoising algorithms and filters mainly based on reasonable noise models. The filter is mainly classified into four (4) types: a linear filter, a non-linear filter, a diffusion filter, and a multi-scale analysis based filter. The four existing filters all may reduce noise. However, when the filter is applied to an OCT image, there are limitations: (1) a filter with a relatively superior effect does not satisfy the requirement of an OCT system of performing processing in real time at a high speed, (2) some particular noise in an OCT image is not processed due to limits of a filter model which is used, and (3) a filtered image is unclear so that details of the filtered image are not clearly displayed.

Recently, an algorithm for reducing some noise of a 3D OCT image has been developed. To a degree, this solves the defect where an image is made unclear in a process of filtering using a 2D filter. An averaging method mainly includes an averaging method based on kinetic compensation and an averaging method based on a multi-scale wavelet analysis. According to an article entitled "Sparsity Based Denoising of Spectral Domain Optical Coherence Tomography Images," by L. fang, S. Li, Q. Nie, J. A. Izatt, C. A. Toth, and S. Farsiu, a method of denoising a 3D OCT image based on sparsity is suggested and thus an unclear image according to the averaging method may be further enhanced. However, the processing speed of the 3D denoising method may not satisfy actual processing requirements.

A general image is obtained by using a charge coupled device (CCD) or a photosensitive film and noise characteristics of pixels of the general image are the same. However, an OCT image is obtained by individually scanning a point or a line and noise characteristics of each point is very closely related to a state of a system at a fixed time point and a state of a scanned object. Accordingly, a current method of denoising a 3D OCT image may not effectively reduce various noises having different noise characteristics. To summarize, current image denoising methods have at least the following problems: (1) A 2D filter and a 3D filter having a relatively superior effect do not satisfy the requirements of an OCT system which operates at a high speed and in real time, (2) noise having different noise characteristics from a particular noise in an OCT image is not processed; and (3) an image that is a result of filtering is not interpreted in detail because details of the image are unclear.

SUMMARY

One or more exemplary embodiments provide a method and apparatus for enhancing quality of a 3 dimensional (3D) image by denoising the 3D image and enhancing a contrast ratio of the 3D image.

Additional aspects of the exemplary embodiments will be set forth in part in the description which follows and, in part, will be apparent from the description, or may be learned by practice of the exemplary embodiments.

According to an aspect of an exemplary embodiment, a method of enhancing a quality of a 3 dimensional (3D) image includes classifying an input 3D image into a plurality of sub-areas based on noise characteristics of the plurality of sub-areas of the input 3D image, denoising each of the plurality of sub-areas of the input 3D image by using different denoising methods according to noise characteristics of each of the classified plurality of sub-areas and obtaining a second 3D image after the denoising, and enhancing a contrast ratio of the second 3D image after the denoising.

In the classifying the input 3D image into the plurality of sub-areas, the input 3D image may be classified into a foreground area and a background area based on the noise characteristics of the input 3D image.

The classifying the input 3D image into the plurality of sub-areas may include receiving the input 3D image, selecting a target image sequentially from a first frame to a last frame of the input 3D image, and classifying the selected target image into a foreground area and a background area based on the noise characteristics of the plurality of sub-areas of the input 3D image.

In the input 3D image, a pixel having brightness that exceeds a predetermined critical value may be classified into the foreground area and a pixel having a brightness that is less than or equal to the predetermined critical value may be classified into the background area.

In the denoising each of the plurality of sub-areas of the input 3D image, the input 3D image may be denoised using a bilinear denoising model shown in Equation 5, $$f_i = \alpha_{1i}(\overline{a}_{1i}g_i + \overline{b}_{1i}) + \alpha_{2i}(\overline{a}_{2i}\overline{g}_1 + \overline{b}_{2i}) \quad \text{[Equation 5]}$$

wherein, in Equation 5, "$f_i$" is brightness of a pixel i included in a 3D image after the denoising, "$g_i$" denotes brightness of the pixel i included in the input 3D image, "$\overline{g}_i$" denotes an average of brightness of all pixels included in the background area of the input 3D image, and "$\alpha_{1i}$" and "$\alpha_{2i}$" are classification parameters of a foreground area and a background area of the input 3D image, respectively, wherein, according to Equation 4, "$a_{1i}$" and "$b_{1i}$" are calculated in a 3D image object of the input 3D image with respect to the pixel i, and "$a_{2i}$" and "$b_{2i}$" are calculated in a plane region of the input 3D image with respect to the pixel i, $$a_i = \frac{\frac{1}{\omega}\sum g_k^2 - \overline{g}_{\omega_i}^2}{\frac{1}{\omega}\sum g_k^2 - \overline{g}_{\omega_i}^2 + \sigma^2}, \quad \text{[Equation 4]}$$

$$b_i = \overline{g}_{\omega_i}(1 - a_i)$$

wherein, in Equation 4, "$\omega$" denotes the number of pixels included in the 3D image object or the plane region "$\omega_i$"; "$g_k$" denotes brightness of a pixel k included in the 3D image object or the plane region "$\omega_i$"; "$\overline{g}_{w_i}$" denotes an average of brightness of all pixels included in the 3D image object or the plane region "$\omega_i$", and "$\sigma^2$" denotes a variance of brightness of each pixel of the input 3D image, wherein, in Equation 5, "$\overline{a}_{1i}$" and "$\overline{b}_{1i}$" respectively denote averages of "$a_{1i}$" and "$b_{1i}$" of each pixel included in the 3D image object, and "$\overline{a}_{2i}$" and "$\overline{b}_{2i}$" respectively denote averages of "$a_{2i}$" and "$b_{2i}$" of each pixel included in the plane region.

The 3D image object may be a 3D cube having a size of about 8×8×10 pixels with respect to the pixel i and the plane region has a size of about 8×8 pixels with respect to the pixel i.

The "$\alpha_{1i}$" and "$\alpha_{2i}$" may be determined based on Equation 3, $$\begin{cases} \alpha_{1i} = 1 \; \alpha_{2i} = 0; \; \overline{g}_{\omega_i} > \overline{N}_{back} \\ \alpha_{1i} = 0 \; \alpha_{2i} = 1; \; \overline{g}_{\omega_i} \leq \overline{N}_{back} \end{cases} \quad \text{[Equation 3]}$$

wherein, in Equation 3, "$\overline{g}_{w_i}$" denotes an average of brightness of all pixels included in a plane region "$\omega_i$" with respect to the pixel i and "$\overline{N}_{back}$" is a predetermined critical value indicating an average of brightness of pixels included in the background area of the input 3D image.

The enhancing the contrast ratio of the second 3D image after the denoising may include classifying the second 3D image after the denoising into a high frequency component and a low frequency component and enhancing the contrast ratio of the second 3D image after the denoising by performing weighted synthesis on the high frequency component and the low frequency component.

The contrast ratio of the 3D image after the denoising may be enhanced based on Equation 6, $$f_{i,enhanced} = k[f_i - (\overline{a}_{if}f_i + \overline{b}_{if})] + (\overline{a}_{if}f_i + \overline{b}_{if}) \quad \text{[Equation 6]}$$

wherein, in Equation 6, "$f_{i,enhanced}$" denotes brightness of the pixel i included in the 3D image after the enhancement, "$f_i$" denotes brightness of the pixel i included in the 3D image after the denoising; and "k" denotes a high-frequency portion increment factor and is a real number greater than 1, wherein "$a_{if}$" and "$b_{if}$" included in the plane region of the 3D image after the denoising with respect to the pixel i are calculated according to Equation 4, $$a_{if} = \frac{\frac{1}{\omega}\sum g_k^2 - \overline{g}_{\omega_i}^2}{\frac{1}{\omega}\sum g_k^2 - \overline{g}_{\omega_i}^2 + \sigma^2}, \quad \text{[Equation 7]}$$

$$b_{if} = \overline{g}_{\omega_i}(1 - a_{if})$$

wherein, in Equation 7, "$\omega$" denotes the number of pixels included in the plane region "$\omega_i$"; "$g_k$" denotes brightness of a pixel k included in the plane region "$\omega_i$"; "$\overline{g}_{w_i}$" denotes an average of brightness of all pixels included in the plane region "$\omega_i$", and "$\sigma^2$" denotes a variance of brightness of each pixel of the input 3D image after the denoising, wherein "$\overline{a}_{if}$" and "$\overline{b}_{if}$" denote averages of "$a_{if}$" and "$b_{if}$" of each pixel included in the plane region.

According to another aspect of an exemplary embodiment, an apparatus for enhancing quality of a 3 dimensional (3D) image includes an image classifier configured to classify an input 3D image into a plurality of sub-areas based on noise characteristics of the plurality of sub-areas of the input 3D image, a denoiser configured to denoise each of the plurality of sub-areas of the input 3D image by using different denoising methods according to noise characteristics of each of the classified plurality of sub-areas and configured to obtain a second 3D image after the denoising, and a detail enhancer configured to enhance a contrast ratio of the second 3D image after the denoising.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
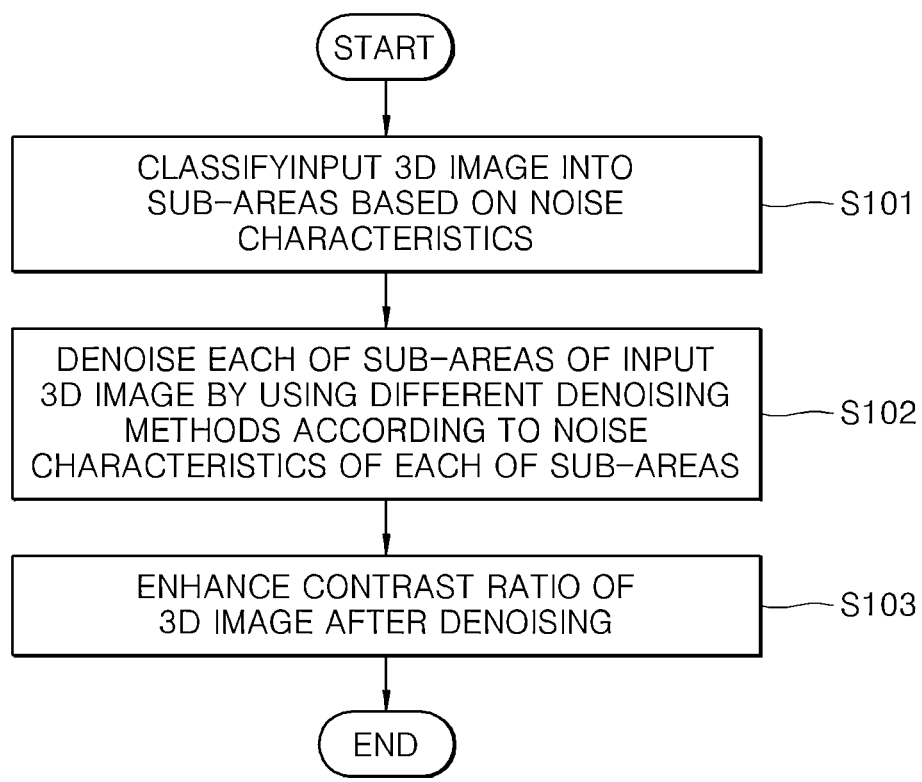
FIG. 1 is a flowchart showing a method of enhancing the quality of 3 dimensional (3D) image, according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are described below by referring to the figures, to explain exemplary aspects.

FIG. 1 is a flowchart showing a method of enhancing the quality of a three dimensional (3D) image, according to an exemplary embodiment. Referring to FIG. 1, in operation S101, an apparatus for enhancing the quality of a 3D image classifies an input 3D image into a plurality of sub-areas based on noise characteristics. In detail, in operation S101, the apparatus for enhancing the quality of a 3D image may receive a 3D image which is input and selects a target image sequentially from a first frame to a last frame of the input 3D image. The apparatus for enhancing the quality of a 3D image may classify a selected target image into a foreground and a background based on the noise characteristics. A 3D optical coherence tomography (OCT) image mainly includes additive noise and multiplicative noise. The additive noise exists in the whole image area and the multiplicative noise mainly exits in an area where signals exist.

Figure 2A:
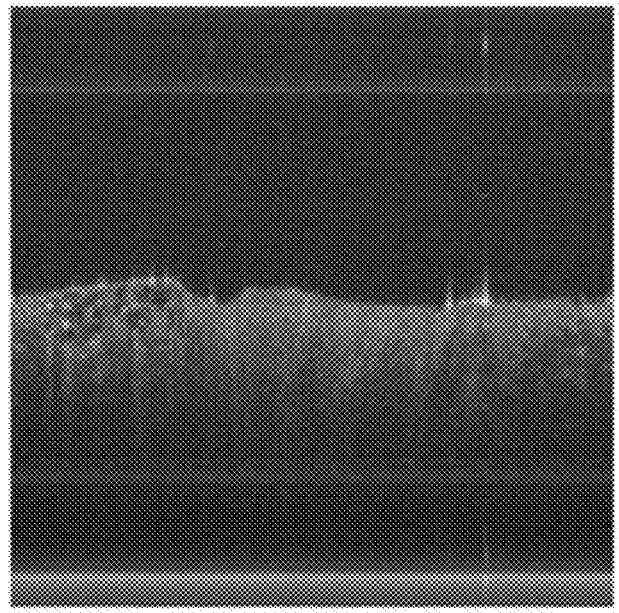
FIGS. 2A and 2B are an image before denoising and an image after denoising, respectively.

As illustrated in FIG. 2A, an image is divided into a relatively bright foreground area (signal region) and a relatively dark background area (no signal or weak signal region). In detail, the apparatus for enhancing the quality of a 3D image divides an image into a foreground area mainly configured with multiplicative noise and a background area mainly configured with additive noise according to a critical value. In other words, the apparatus for enhancing the quality of a 3D image divides pixels included in the input 3D image and having brightness greater than a predetermined critical value into the foreground area and pixels included in the input 3D image and having brightness lower than or equal to than a predetermined critical value into the background area. The predetermined critical value is indicated by "$\overline{N}_{back}$" and the critical value indicates an average value of brightness of all pixels in the background area. In an exemplary embodiment, the apparatus for enhancing the quality of a 3D image may fix "$\overline{N}_{back}$" appropriate for the 3D image based on an experiment or a previous result. However, the exemplary embodiments are not limited thereto and the apparatus for enhancing the quality of a 3D image may fix the "$\overline{N}_{back}$" appropriate for the input 3D image by using a method of the related art. In addition, the division of sub-areas is not limited to the above division by using a critical value and all available methods for dividing an image based on the noise characteristics of a 3D image may be employed.

In operation S102, the apparatus for enhancing the quality of a 3D image may denoise each sub-area of the input 3D image by applying a different denoising method to each sub-area according to the noise characteristics of each divided sub-area, and obtains a 3D image after the denoising. In detail, a model of a 3D OCT image may be expressed by Equation 1.

$$f_i = a_i g^i + b_i \qquad \text{[Equation 1]}$$

In Equation 1, "$a_i$" denotes multiplicative noise of a pixel i included in the input 3D image; "$b_i$" denotes additive noise of the pixel i included in the input 3D image; "$f_i$" denotes brightness of the pixel i included in the input 3D image after denoising; and "$g_i$" denotes brightness of the pixel i included in the input 3D image.

In order to denote the background area, the apparatus for enhancing the quality of a 3D image obtains an average of additive noise of the background area of the 3D image which is input to remove most additive noise, and restores a background area after the averaging by using Equation 1. On the other hand, the apparatus for enhancing the quality of a 3D image may restore the input 3D image by using Equation 1 to denoise the foreground area. The denoising strategy may be embodied by using a bilinear denoising model shown in Equation 2.

$$f_i = \alpha_{1i}(\overline{a}_{1i} g_i + \overline{b}_{1i}) + \alpha_{2i}(a_{2i} \overline{g}_i + \overline{b}_{2i}) \qquad \text{[Equation 2]}$$

In Equation 2, "$\overline{g}_i$" denotes an average brightness of all pixels included in the background area of the input 3D image and "$\alpha_{1i}$" and "$\alpha_{2i}$" are classification parameters of a foreground area and a background area of the input 3D image, respectively. "$\alpha_{1i}$" and "$\alpha_{2i}$" may be fixed based on Equation 3.

$$\begin{cases} \alpha_{1i} = 1\, \alpha_{2i} = 0;\, \overline{g}_{\omega_i} > \overline{N}_{back} \\ \alpha_{1i} = 0\, \alpha_{2i} = 1;\, \overline{g}_{\omega_i} \le \overline{N}_{back} \end{cases} \qquad \text{[Equation 3]}$$

In Equation 3, "$\overline{g}_{w_i}$" denotes an average of brightness of all pixels included in a plane region "$\omega_i$" with respect to the pixel i and "$\overline{N}_{back}$" is a predetermined critical value indicating an average brightness of pixels included in the background area of the input 3D image. The plane region "$\omega_i$" has a size of about 8×8 pixels with respect to the pixel i. However, this is a merely an example and the plane region may have a different size. For example, "$\overline{g}_{w_i}$" may indicate an average brightness of all pixels included in a 3D cube with respect to the pixel i.

Based on Equation 4 below, "$a_{1i}$" and "$b_{1i}$" in a 3D image object input with respect to the pixel i may be calculated and "$a_{2i}$" and "$b_{2i}$" in the plane region of a 3D image input with respect to the pixel i may be calculated. The 3D image object may be a 3D cube having a size of about 8×8×10 pixels with respect to the pixel i. The plane region may have a size of about 8×8 pixels with respect to the pixel i. However, the exemplary embodiments are not limited thereto and a 3D image object having an appropriate size and the plane region may be selected.

$$a_i = \frac{\frac{1}{\omega}\sum g_k^2 - \overline{g}_{\omega_i}^2}{\frac{1}{\omega}\sum g_k^2 - \overline{g}_{\omega_i}^2 + \sigma^2}, \qquad \text{[Equation 4]}$$

$$b_i = \overline{g}_{\omega_i}(1 - a_i)$$

In Equation 4, "$\omega$" denotes the number of pixels included in the 3D image object or the plane region "$\omega_i$"; "$g_k$" denotes the brightness of a pixel k included in the 3D image object or the plane region "$\omega_i$"; "$\overline{g}_{w_i}$" denotes an average of brightness of all pixels included in the 3D image object or the plane region "$\omega_i$", and "$\sigma^2$" denotes a variance of brightness of each pixel of the input 3D image.

In an exemplary embodiment, an average of "$a^k$" calculated with respect to each pixel k included in the 3D image object or the plane region "$\omega_i$" is used as an actual reference value, and Equation 2 may be corrected into Equation 5 below.

$$f_i = \alpha_{1i}(\overline{a}_{1i} g_i + \overline{b}_{1i}) + \alpha_{2i}(\overline{a}_{2i} \overline{g}_i + \overline{b}_{2i}) \qquad \text{[Equation 5]}$$

In Equation 5, "$\overline{a}_{1i}$" and "$\overline{b}_{1i}$" respectively denote averages of "$a_{1i}$" and "$b_{1i}$" calculated with respect to each pixel included in the 3D image object, and "$\overline{a}_{2i}$" and "$\overline{b}_{2i}$" respectively denote averages of "$a_{2i}$" and "$b_{2i}$" calculated with respect to each pixel included in the plane region. The input 3D image processed in the operation S102 is a target image that is sequentially selected from the first frame to the last frame of the input 3D image.

Figure 2B:
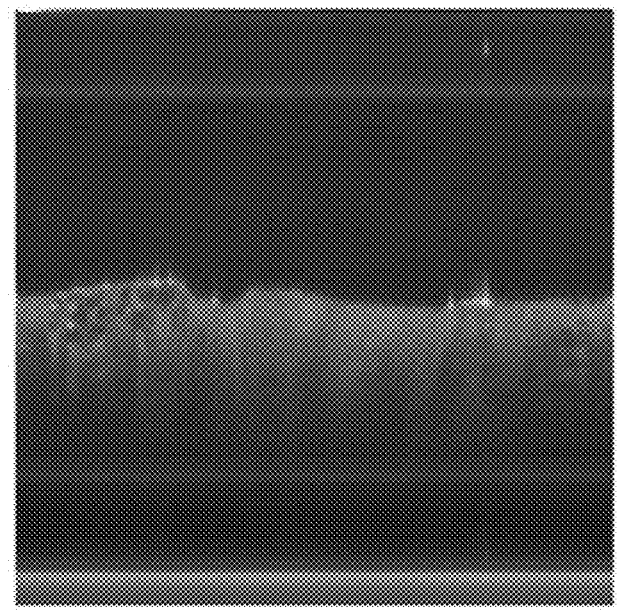

FIG. 2B is a 3D image after denoising obtained by using a bilinear model as suggested by Equation 5. Although noise is remarkably reduced in FIG. 2B compared to FIG. 2A, details of the image become unclear during the denoising process. Accordingly, the following operations are performed.

In operation S103, the apparatus for enhancing the quality of a 3D image enhances a contrast ratio of the 3D image after the denoising. In detail, in operation S103, the apparatus for enhancing the quality of a 3D image first classifies the 3D image after the denoising into a high frequency component and a low frequency component. Next, the apparatus for enhancing the quality of a 3D image enhances the contrast ratio of a 3D image by performing weighted synthesis on the high frequency component and the low frequency component. According to an exemplary embodiment, the contrast ratio of the 3D image after the denoising may be enhanced based on Equation 6 below.

$$f_{i,enhanced} = k[f_i - (\overline{a}_{if} f_i + \overline{b}_{if})] + (\overline{a}_{if} f_i + \overline{b}_{if}) \quad \text{[Equation 6]}$$

In Equation 6, "$f_{i,enhanced}$" denotes the brightness of the pixel i included in the 3D image after the enhancement; "$f_i$" denotes the brightness of the pixel i included in the 3D image after the denoising; and "k" denotes a high-frequency portion increment factor and is also a real number greater than 1. "$a_{if}$" and "$b_{if}$" may be calculated in the plane region of the 3D image after the denoising with respect to the pixel i through Equation 4. Next, averages of "$a_{if}$" and "$b_{if}$" that are calculated with respect to each pixel included in the plane region are set to be "$\overline{a}_{1i}$" and "$\overline{b}_{1i}$". In this connection, the plane region may be the plane region having a size of about 8×8 pixels with respect to the pixel i. However, the exemplary embodiments are not limited thereto and the apparatus for enhancing the quality of a 3D image may select a plane region having a different size. In addition, in the exemplary embodiment, an appropriate value is selected in a range of greater than 1 and smaller than 10 and may be used as the high-frequency portion increment factor k.

Figure 3A:
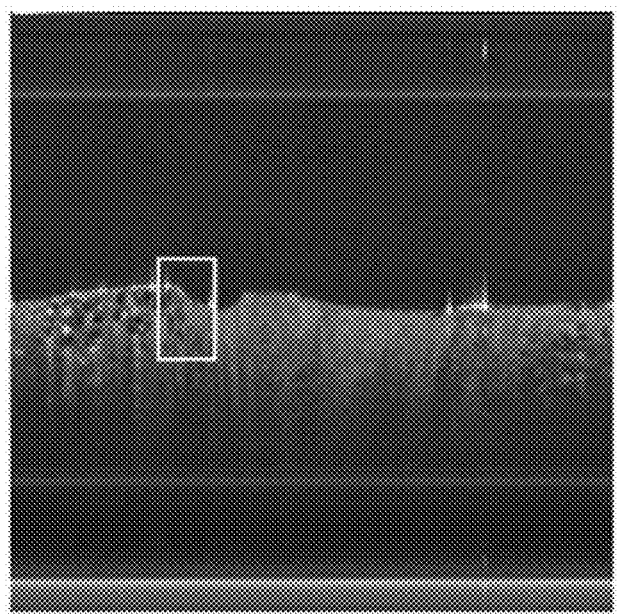
FIGS. 3A to 3C are comparative images obtained by employing different denoising methods.
Figure 3B:
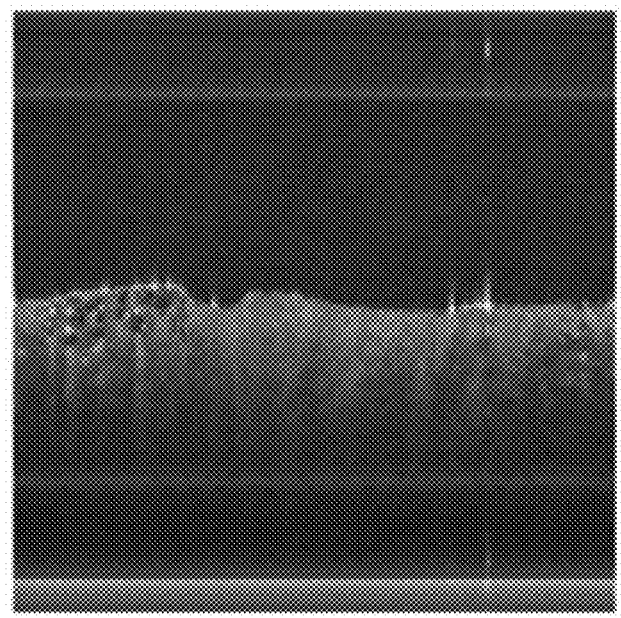
Figure 3C:
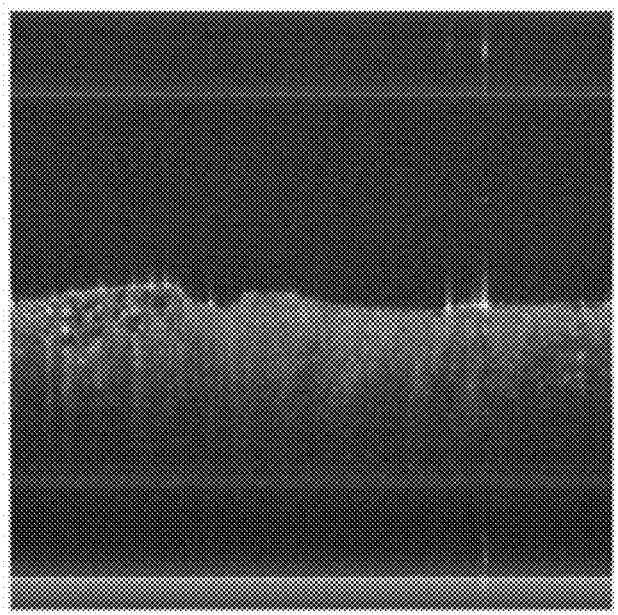

FIG. 3A is an image obtained by processing the same image as that in FIG. 2A by using the method of enhancing the quality of a 3D image according to an exemplary embodiment. When FIG. 2A and FIG. 2B are compared with each other, the method of enhancing the quality of a 3D image according to an exemplary embodiment enhances details of the 3D image and simultaneously denoises the 3D image. FIG. 3B illustrates an image that is obtained by denoising the same image as that of FIG. 2A by using a guided filter that is described in an article entitled "Optical Coherence Tomography" written by A. F. Fercher. FIG. 3C illustrates an image that is obtained by denoising the same image as that of FIG. 2A by using a bilateral filter that is described in an article entitled "Bilateral Filtering for Gray And Color Images" written by C. Tomasi and R. Manduchi. Compared to a box portion in FIG. 3A, a superior denoising effect may be obtained by using the method of enhancing the quality of a 3D image according to the exemplary embodiment.

Figure 4:
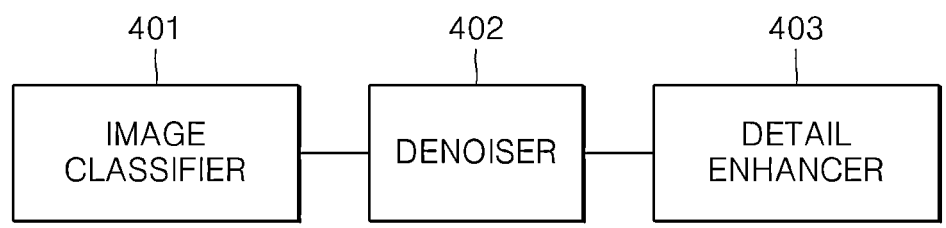
FIG. 4 is a block diagram illustrating an apparatus for enhancing the quality of a 3D image, according to an exemplary embodiment.

FIG. 4 is a block diagram illustrating an apparatus for enhancing the quality of a 3D image, according to an exemplary embodiment. Referring to FIG. 4, the apparatus for enhancing the quality of a 3D image may include an image classifier 401, a denoiser 402, and a detail enhancer 403.

The image classifier 401 classifies a 3D image which is input into a plurality of sub-areas based on noise characteristics. For example, the image classifier 401 may receive the input 3D image, select a target image sequentially from a first frame to a last frame of the input 3D image, and classify the target image into a foreground area and a background area according to the noise characteristics. As described above, the image classifier 401 may classify the 3D image that is input by a critical value method into the foreground area and the background area. The denoiser 402 may denoise each sub-area of the 3D image by using a different denoising strategy according to the noise characteristics of each sub-area, thereby obtaining a 3D image after the denoising. For example, the denoiser 402 may denoise the input 3D image by using the bilinear denoising model according to Equation 5. The detail enhancer 403 may enhance a contrast ratio of the 3D image after the denoising. Specifically, the detail enhancer 403 may classify the 3D image after the denoising into a high frequency component and a low frequency component and perform weighted synthesis on the high frequency component and the low frequency component, thereby enhancing the contrast ratio of the 3D image after the denoising. For example, the detail enhancer 403 may enhance the contrast ratio of the 3D image after the denoising according to Equation 6.

The method of enhancing the quality of a 3D image according to the exemplary embodiments can be embodied as computer readable codes on a computer readable recording medium. The computer readable recording medium is any data storage device that can store data which can be thereafter read by a computer system.

The method and apparatus for enhancing the quality of a 3D image according to the exemplary embodiments are effective because calculation speed is fast, denoising and detail enhancement abilities are strong, and direct application to a commercial OCT system is available. Thus, the quality of an image is enhanced. In addition, the bilinear denoiser according to the exemplary embodiment has nonidentity noise characteristics in an image and may be effectively applied to a medical imaging system using point scanning or line scanning.

It should be understood that the exemplary embodiments described herein should be considered in a descriptive sense only and not for purposes of limitation. Descriptions of features or aspects within each exemplary embodiment should typically be considered as available in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method of enhancing a quality of a 3 dimensional (3D) image, the method comprising:
    classifying an input 3D image into a plurality of sub-areas based on noise characteristics of the plurality of sub-areas of the input 3D image;
    denoising each of the plurality of sub-areas of the input 3D image by using different denoising methods according to noise characteristics of each of the classified plurality of sub-areas and obtaining a second 3D image after the denoising; and
    enhancing a contrast ratio of the second 3D image after the denoising.

2. The method of claim 1, wherein, in the classifying the input 3D image into the plurality of sub-areas, the input 3D image is classified into a foreground area and a background area based on the noise characteristics of the input 3D image.

3. The method of claim 1, wherein the classifying the input 3D image into the plurality of sub-areas comprises:
receiving the input 3D image;
selecting a target image sequentially from a first frame to a last frame of the input 3D image; and
classifying the selected target image into a foreground area and a background area based on the noise characteristics of the plurality of sub-areas of the input 3D image.

4. The method of claim 2, wherein, in the input 3D image, a pixel having a brightness that exceeds a predetermined critical value is classified into the foreground area and a pixel having a brightness that is less than or equal to the predetermined critical value is classified into the background area.

5. The method of claim 2, wherein, in the denoising each of the plurality of sub-areas of the input 3D image, the input 3D image is denoised using a bilinear denoising model shown in Equation 5, $$f_i = \alpha_{1i}(\bar{a}_{1i}g_i + \bar{b}_{1i}) + \alpha_{2i}(\bar{a}_{2i}g_i + \bar{b}_{2i})$$ [Equation 5]

wherein, in Equation 5, "$f_i$" is brightness of a pixel i included in a 3D image after the denoising, "$g_i$" denotes brightness of the pixel i included in the input 3D image, "$\bar{g}_i$" denotes an average of brightness of all pixels included in the background area of the input 3D image, and "$\alpha_{1i}$" and "$\alpha_{2i}$" are classification parameters of a foreground area and a background area of the input 3D image, respectively,
wherein, according to Equation 4, "$a_{1i}$" and "$b_{1i}$" are calculated in a 3D image object of the input 3D image with respect to the pixel i, and "$a_{2i}$" and "$b_{2i}$" are calculated in a plane region of the input 3D image with respect to the pixel i, $$a_i = \frac{\frac{1}{\omega}\sum g_k^2 - \bar{g}_{\omega_i}^2}{\frac{1}{\omega}\sum g_k^2 - \bar{g}_{\omega_i}^2 + \sigma^2},$$ [Equation 4]

$$b_i = \bar{g}_{\omega_i}(1 - a_i)$$

wherein, in Equation 4, "ω" denotes the number of pixels included in the 3D image object or the plane region "$\omega_i$"; "$g_k$" denotes brightness of a pixel k included in the 3D image object or the plane region "$\omega_i$"; "$\bar{g}_i$" denotes an average of brightness of all pixels included in the 3D image object or the plane region "$\omega_i$" and "$\sigma^2$" denotes a variance of brightness of each pixel of the input 3D image,
wherein, in Equation 5, "$\bar{a}_{1i}$" and "$\bar{b}_{1i}$" respectively denote averages of "$a_{1i}$" and "$b_{1i}$" of each pixel included in the 3D image object, and "$\bar{a}_{2i}$" and "$\bar{b}_{2i}$" respectively denote averages of "$a_{2i}$" and "$b_{2i}$" of each pixel included in the plane region.

6. The method of claim 5, wherein the 3D image object is a 3D cube having a size of about 8×8×10 pixels with respect to the pixel i and the plane region has a size of about 8×8 pixels with respect to the pixel i.

7. The method of claim 5, wherein the "$\alpha_{1i}$" and "$\alpha_{2i}$" are determined based on Equation 3, $$\begin{cases} \alpha_{1i} = 1\, \alpha_{2i} = 0;\ \bar{g}_{\omega_i} > \bar{N}_{back} \\ \alpha_{1i} = 0\, \alpha_{2i} = 1;\ \bar{g}_{\omega_i} \leq \bar{N}_{back} \end{cases}$$ [Equation 3]

wherein, in Equation 3, "$\bar{g}_i$" denotes an average of brightness of all pixels included in a plane region "$\omega_i$" with respect to the pixel i and "$\bar{N}_{back}$" is a predetermined critical value indicating an average of brightness of pixels included in the background area of the input 3D image.

8. The method of claim 2, wherein the enhancing the contrast ratio of the second 3D image after the denoising comprises:
classifying the second 3D image after the denoising into a high frequency component and a low frequency component; and
enhancing the contrast ratio of the second 3D image after the denoising by performing weighted synthesis on the high frequency component and the low frequency component.

9. The method of claim 2, wherein the contrast ratio of the 3D image after the denoising is enhanced based on Equation 6, $$f_{i,enhanced} = k[f_i - (\bar{a}_{if}f_i + \bar{b}_{if})] + (\bar{a}_{if}f_i + \bar{b}_{if})$$ [Equation 6]

wherein, in Equation 6, "$f_{i,enhanced}$" denotes brightness of the pixel i included in the 3D image after the enhancement, "$f_i$" denotes brightness of the pixel i included in the 3D image after the denoising; and "k" denotes a high-frequency portion increment factor and is a real number greater than 1,
wherein "$a_{if}$" and "$b_{if}$" included in the plane region of the 3D image after the denoising with respect to the pixel i are calculated according to Equation 4, $$a_{ii} = \frac{\frac{1}{\omega}\sum g_k^2 - \bar{g}_{\omega_i}^2}{\frac{1}{\omega}\sum g_k^2 - \bar{g}_{\omega_i}^2 + \sigma^2},$$ [Equation 7]

$$b_{if} = \bar{g}_{\omega_i}(1 - a_{if})$$

wherein, in Equation 7, "ω" denotes the number of pixels included in the plane region "$\omega_i$"; "$g_k$" denotes brightness of a pixel k included in the plane region "$\omega_i$"; "$\bar{g}_{w_i}$" denotes an average of brightness of all pixels included in the plane region "$\omega_i$", and "$\sigma^2$" denotes a variance of brightness of each pixel of the input 3D image after the denoising,
wherein "$\bar{a}_{if}$" and "$\bar{b}_{if}$" denote averages of "$a_{if}$" and "$b_{if}$" of each pixel included in the plane region.

10. An apparatus for enhancing a quality of a 3 dimensional (3D) image, the apparatus comprising:
an image classifier configured to classify an input 3D image into a plurality of sub-areas based on noise characteristics of the plurality of sub-areas of the input 3D image;
a denoiser configured to denoise each of the plurality of sub-areas of the input 3D image by using different denoising methods according to noise characteristics of each of the classified plurality of sub-areas and configured to obtain a second 3D image after the denoising; and
a detail enhancer configured to enhance a contrast ratio of the second 3D image after the denoising.

* * * * *